(12) United States Patent
Aoyama et al.

(10) Patent No.: US 8,150,413 B2
(45) Date of Patent: Apr. 3, 2012

(54) RADIO NETWORK DESIGNING APPARATUS AND METHOD

(75) Inventors: Akio Aoyama, Tokyo (JP); Koujirou Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 907 days.

(21) Appl. No.: 12/093,522

(22) PCT Filed: Oct. 25, 2006

(86) PCT No.: PCT/JP2006/321273
§ 371 (c)(1),
(2), (4) Date: May 13, 2008

(87) PCT Pub. No.: WO2007/060808
PCT Pub. Date: May 31, 2007

(65) Prior Publication Data
US 2009/0088171 A1    Apr. 2, 2009

(30) Foreign Application Priority Data

Nov. 22, 2005 (JP) ................................. 2005-336909

(51) Int. Cl.
*H04W 72/00* (2009.01)
(52) U.S. Cl. ...................................................... 455/453
(58) Field of Classification Search .................... 455/453
See application file for complete search history.

(56) References Cited

U.S. PATENT DOCUMENTS

| 6,421,005 B1 * | 7/2002 | Weaver et al. ................ 342/367 |
| 6,748,241 B2 * | 6/2004 | Voyer .......................... 455/562.1 |
| 2002/0193095 A1 * | 12/2002 | Hutcheson et al. ........... 455/408 |

FOREIGN PATENT DOCUMENTS

| CN | 1295388 A | 5/2001 |
| EP | 1098545 A2 | 5/2001 |
| JP | 8-322079 A | 12/1996 |
| JP | 11-504485 A | 4/1999 |
| JP | 2000-156885 A | 6/2000 |
| JP | 2001-203631 A | 7/2001 |
| JP | 2001-285923 A | 10/2001 |
| JP | 2003-111133 A | 4/2003 |
| JP | 2004-201269 A | 7/2004 |
| JP | 2005-117357 A | 4/2005 |
| WO | WO-96/35305 A1 | 11/1996 |

* cited by examiner

*Primary Examiner* — Marisol Figueroa
(74) *Attorney, Agent, or Firm* — Dickstein Shapiro LLP

(57) ABSTRACT

Disclosed is a technology for easy balancing between cells by securing a cell balance, using an optimization process adopting a radio parameter as a parameter of an objective function. Objective function extractor 11 sets up optimizing condition at least including an objective function that has a radio parameter of a base station as the objective function parameter and is used for an optimization process to balance traffic loads between cells, using cell balance values between a target cell whose characteristic changes by modification of the parameter and neighboring cells existing around the target cell. Optimizer 12 performs an optimization process in accordance with the optimizing condition set by objective function extractor 11 to determine the value of the parameter to be the solution.

20 Claims, 6 Drawing Sheets

RADIO NETWORK DESIGNING APPARATUS AND METHOD

TECHNICAL FIELD

The present invention relates to an apparatus and method for designing a radio communication network including a plurality of cells.

BACKGROUND ART

In a radio communication network including a plurality of cells, a load is placed on each cell from traffic. The cells that receive higher loads have higher probabilities to experience call loss and packet discard. Accordingly, in designing such a radio communication network, it is preferable that a traffic load is appropriately set up for the traffic capacity of each cell. Further in a radio communication network including a plurality of cells, there are spots where the communication quality degrades due to interference between transmission signals from different cells. Accordingly, it is preferable to reduce such spots where communication quality degrades in a predetermined area. Here, the ratio of the spots where communication quality degrades and which occupy the predetermined area will be named the degradation ratio; for example, a spot where SIR (signal power-to-interference power ratio) does not satisfy the predetermined value will be named a spot with degraded communication quality.

For example, if all the cells have an equal traffic capacity and the requirement for degradation ratio is uniform across the whole area, it is preferable that all the cells undergo equal traffic load in view of load balancing. Conventionally, there is known a technique for controlling the load on each cell in a radio network (see Japanese Patent Application Laid-open 2005-117357).

The traffic load on each cell is equal to a product of "the traffic quantity expected to arise per unit area (expected traffic quantity per unit area)" and "the cell area". Accordingly, if, for example the expected traffic quantity per unit area is uniformly distributed, it is preferable that radio network design be carried out so that all the cells will be equal in area size.

In radio network designing, normalization of the traffic loads on all the cells will be called cell-balancing. Specifically, this corresponds to the case where the traffic load on each cell is adapted to be close to the others if the demanded degradation ratio is equal across the whole area, or the case where each cell has an area whose size is close to the others when the expected traffic quantity per unit area is uniformly distributed.

The traffic load on each cell is usually determined by a simulation using a radio network designing tool. Specifically, the radio network designing tool determines first the cell boundary of every cell from the tilt angles of the antennas, transmission powers from the antennas, terrain undulations, mutual interference at each cell and the like, then calculates the cell areas. Next, the radio network designing tool multiplies the expected traffic quantity per unit area by the cell area so as to calculate the traffic load on each cell.

In the conventional radio network designing tool, the operator of the radio network designing tool modifies the parameters such as tilt angles of antennas and transmission powers and repeats calculating processes of traffic loads to thereby determine proper parameters that can strike a balance between cells.

Incidentally, in radio network designing there are some cases in which the degradation ratios in important areas are demanded to be suppressed to be lower than other areas. In answer to this, there has been proposed a method of automatically setting up parameters to reduce the degradation ratios in important areas by using a radio network designing tool.

FIG. 1 is a chart showing one example of the distribution of important areas. In FIG. 1, in whole area 90 enclosed by the thick solid line a plurality of cells $91_1$~$91_6$ are formed. Cell $91_1$ is assumed to have cell number j=1, cell $91_2$ cell number j=2, cell $91_3$ cell number j=3, cell $91_4$ cell number j=4, cell $91_5$ cell number j=5 and cell $91_6$ cell number j=6. The hatched areas are important areas 92. Each base station 93 can constitute three sectors, and in FIG. 1 the relationship between the sector of each base station 93 and its covering cell is shown by an arrow.

For example, a case will be considered where the degradation ratios of important areas are suppressed to be lower than other areas by using the tilt angles of antennas as parameters. Important areas 92 exist in cell $91_1$ with cell number j=1 and in cell $91_6$ with cell number j=6. Accordingly, the tilt angles of the antenna for cell $91_1$ and the antenna for cell $91_6$ are modified to be greater values in order to lower the degradation ratios of cell $91_1$ and cell $91_6$. Here, it is assumed that as the tilt angle is made greater, the cell area becomes smaller, so that the traffic load is reduced.

DISCLOSURE OF INVENTION

In the conventional method for establishing a balance between cells, the person who designs a radio network had to repeat the modification of parameters and calculation of traffic loads by operating a computer. When designing a radio network including many base stations having a large number of cells, the operator needed to repeat modification of parameters and calculation of traffic loads many times, with the result that the designing work required a long time to complete.

Further, in the conventional method for suppressing the degradation ratios of important areas to low levels, there occurred cases where the traffic load balance between cells became excessively imbalanced. This occurred because in the conventional method no consideration as to the balance with other cells was given when the degradation ratios of the important areas were reduced.

Therefore, the operator of the radio network designing tool had to repeat modification of parameters and calculation in order to strike a balance of traffic loads between cells, after automatic lowering of the degradation ratios of the important areas in accordance with the conventional method occurred, which made the designing work result in a task needing a long time.

An object of the present invention is to provide an apparatus and method which makes it possible to secure a balance between cells in a simple manner in designing a radio communication network having a plurality of cells.

In order to attain the above object, a radio network designing apparatus of the present invention is a radio network designing apparatus for designing a radio network that covers a plurality of cells through ratio waves from base stations, including an objective function extractor and an optimizer.

The objective function extractor sets up an optimizing condition that includes at least an objective function having a radio parameter of a base station, as the objective function parameter, and which is used for an optimization process to balance traffic loads between cells, using cell balance values between a target cell whose characteristic changes by modification of the parameter and neighboring cells existing around the target cell.

The optimizer performs an optimization process in accordance with the optimizing condition set by the objective function extractor to determine the value of the parameter to be the solution.

According to the present invention, since the radio network designing apparatus determines an objective function that has a radio parameter of the base station as a parameter in the objective function exactor and performs an optimization process using an optimization algorithm in the optimizer, it is possible for the operator to easily balance traffic loads between cells in designing a radio network designing apparatus including a plurality of cells.

BEST MODE FOR CARRYING OUT THE INVENTION

A mode for carrying out the present invention will be described in detail with reference to the drawings.

(The First Embodiment)

Here, a configuration in which a balance between cells is achieved by optimizing the tilt angles of antennas as typical radio parameters in base stations will be illustrated by an example. This radio network design is performed by using an optimization algorithm and bringing the values of objective functions to a target value by varying parameters.

Figure 1:
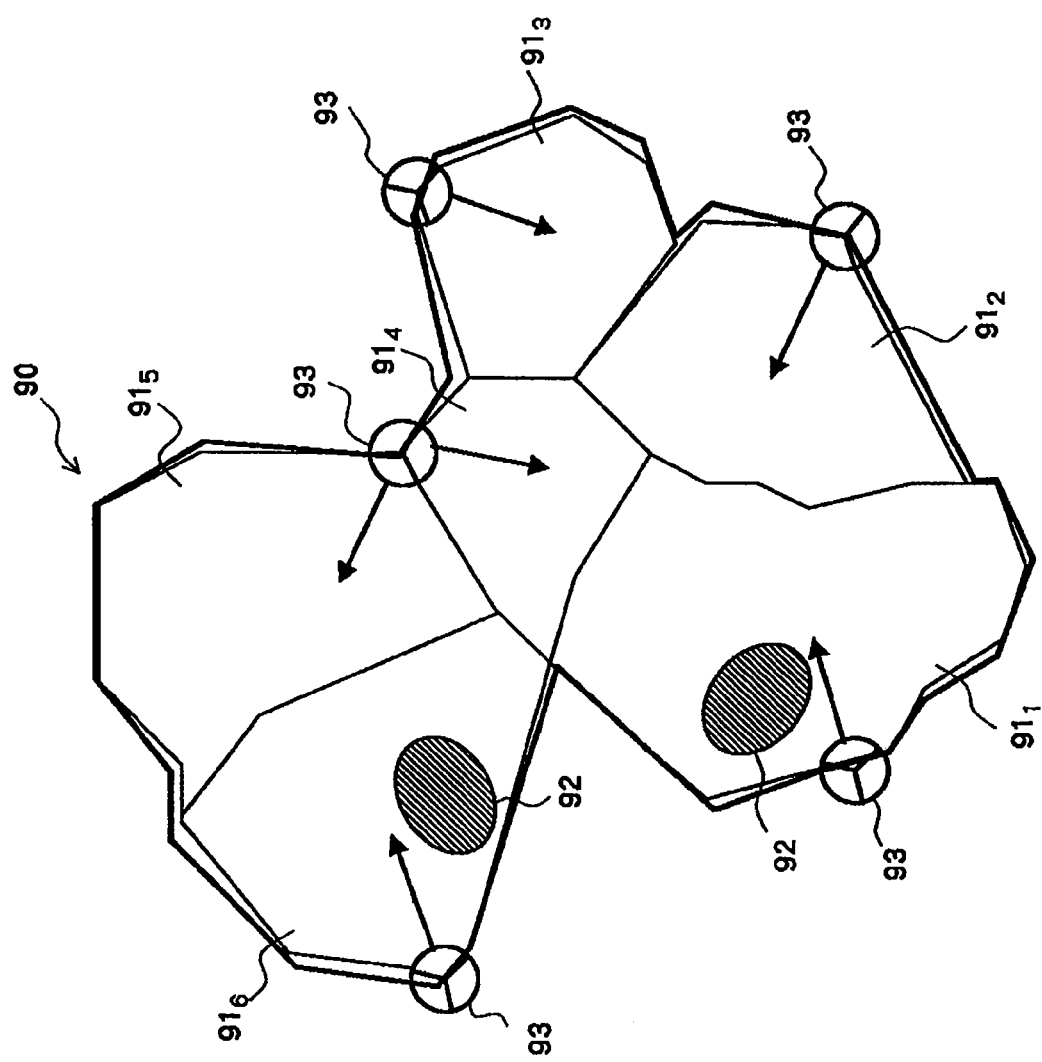
FIG. 1 is a diagram showing one example of the distribution of important areas.
Figure 2:
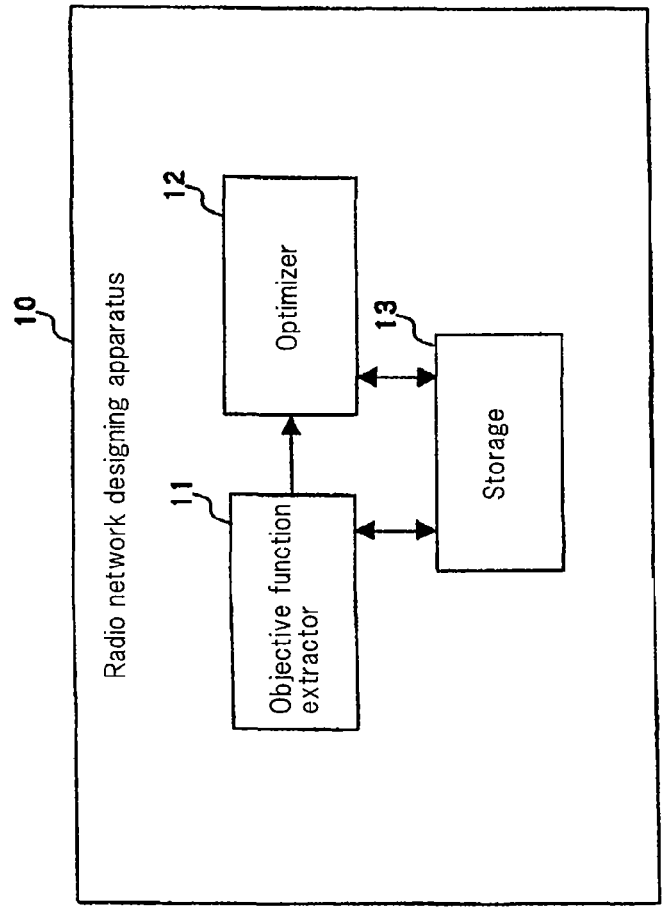
FIG. 2 is a block diagram showing a configuration of a radio network designing apparatus according to the first embodiment.

FIG. 2 is a block diagram showing a configuration of a radio network designing apparatus according to the first embodiment. Referring to FIG. 2, radio network designing apparatus 10 includes objective function extractor 11, optimizer 12 and storage 13.

Storage 13 stores data for extracting objective functions and calculating the values of the objective functions. This data includes fixed data and variable parameters. Examples of the fixed data include terrain data that represents undulations of the terrain within the area. Further, in the present embodiment, since the tilt angles of antennas are assumed to be the only parameters, the deployment of base stations and transmission powers will belong to fixed data. In the present embodiment, the antenna's tilt angle is the only parameter. However, the initial values of the tilt angles of antennas (initial tilt angles) may be input by an operator to radio network designing apparatus 10 and stored as fixed data in storage 13.

Objective function extractor 11 extracts objective functions as indicators that represent the degree of balance of traffic loads between cells, from the data stored in storage 13. The objective function shows that the closer to a predetermined target value, the relationship between cells becomes more balanced. This objective function uses the antenna tilt angle as its parameter.

Optimizer 12 iterates comparison between the calculated value of the objective function and the target value a multiple number of times by varying the tilt angle as a parameter so as to search for the parameter that makes the objective function closer to the target value and outputs the obtained parameter value as a solution. This parameter search makes it possible to normalize traffic load on each cell and establish a balance between cells. This process is the optimization process, and the algorithm used for this is the optimization algorithm. As an optimization algorithm, brute force methods (one-by-one methods), genetic algorithms and other existing general-purpose algorithms can be used.

Also, objective function extractor 11 and optimizer 12 may be realized by making a computer execute software programs for realizing their respective functions.

Figure 3:
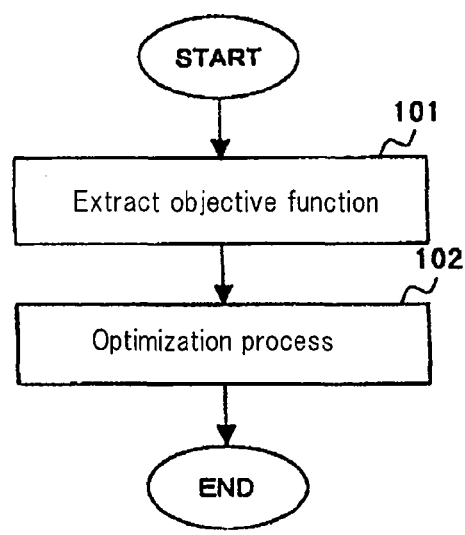
FIG. 3 is a flow chart showing the schematic operation of a radio network designing apparatus according to the first embodiment.

FIG. 3 is a flow chart showing a schematic operation of a radio network designing apparatus according to the first embodiment. Referring to FIG. 3, radio network designing apparatus 10 first extracts objective function to be used for the optimization process (Step 101). Then, radio network designing apparatus 10 performs the optimization process so that the calculated value of the objective function will approach the predetermined target value by varying the parameter (Step 102).

Figure 4:
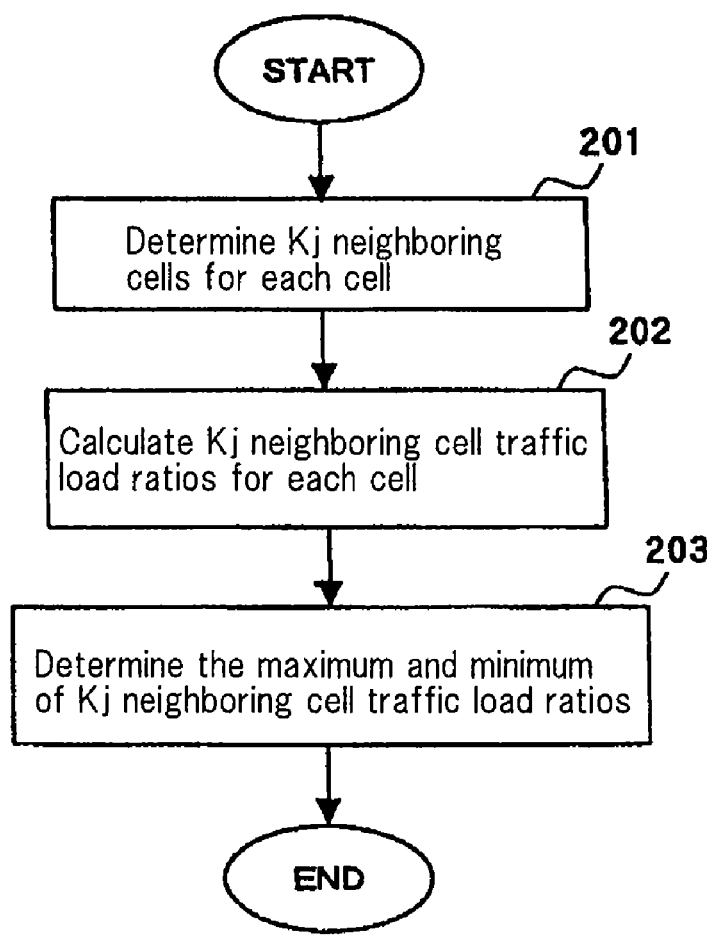
FIG. 4 is a flow chart showing an extracting method of objective function in the first embodiment.

FIG. 4 is a flow chart showing an extracting method of the objective function in the first embodiment. The objective function is defined based on the relationship between the traffic load on a cell as the target of the objective function (target cell: cell number j) and the traffic loads on the neighboring cells of the target cell. The target cell is a cell that varies its properties by varying parameters, and specifically a cell that is covered by the radio wave from the antenna whose tilt angle is tried to be varied.

For example, when the base station is not sectored, and hence uses a non-directional antenna, the cells that are formed by antennas located within a predetermined distance from the antenna that forms the target cell designated by cell number j may be regarded as the neighboring cells.

On the other hand, when the base station is sectored and uses a directional antenna, the cells that are located within a predetermined distance from the antenna that forms the target cell and whose beam peak direction in the horizontal plane opposes the beam peak direction of the target cell may be regarded as the neighboring cells. The condition in which the beam peak directions are opposite to each other can be attained by mutual establishment of the relationship in which, for example the angle formed between the vectors that indicate the horizontal directions of the beam peaks of two antennas is equal to or greater than a predetermined angle and one antenna is located within a predetermined angular range from the beam peak of the other antenna within the horizontal direction.

Figure 5:
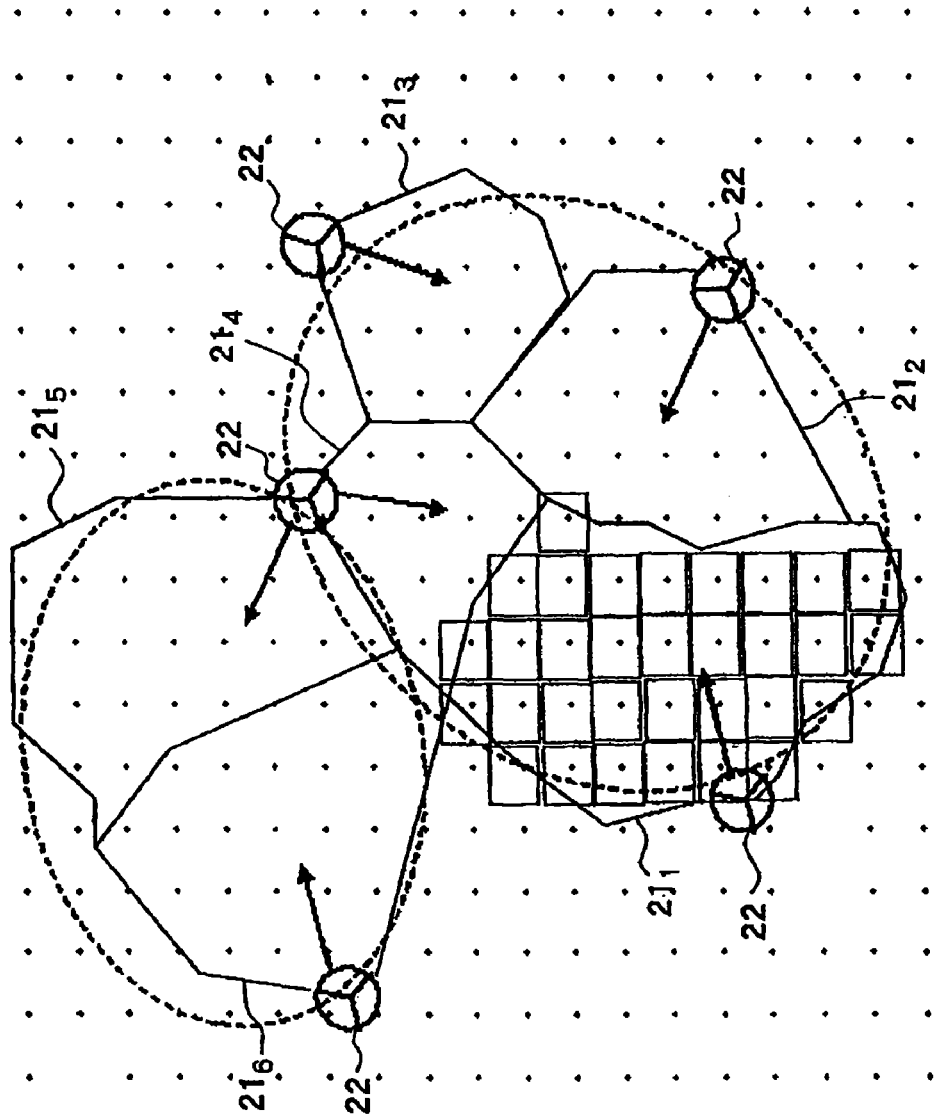
FIG. 5 is a diagram showing one example of the distribution of cells in an area.

FIG. 5 is a diagram showing one example of the distribution of cells in an area. FIG. 5 shows an example of a radio communication network in which base stations are three-sectored. In FIG. 5, the arrows indicate beam peak directions from antennas in the horizontal plane, and this arrow shows the relationship between the sector of each base station 22 and cells 21 that are covered thereby.

In FIG. 5 a plurality of cells $21_1$~$21_6$ enclosed by solid lines are classified into groups of neighboring cells, which are enclosed by dashed lines. In this example, the other cells that belong to the group to which the target cell belong constitute neighboring cells. For example, cells $21_5$ and $21_6$ constitute one group, so that cell $21_5$ is a neighboring cell of cell $21_6$ and cell $21_6$ is a neighboring cell of cell $21_5$. Similarly, cells $21_1$ to $21_4$ constitute one group.

Referring to FIG. 4, radio network designing apparatus 10 determines $K_j(K_j \geq 0)$ neighboring cells for each cell (cell number j) first (Step 201). The set of the neighboring cells for the target cell with cell number j will be named $Z_j$. The number of elements in set $Z_j$ is $K_j$. To determine the neighboring cells, deployment data that represents the base station forming each cell, directional directivity data that indicates the direction of the antenna's directivity may be used, for example. In this case, the deployment data and directivity data are assumed to be stored beforehand in fixed data storage 11.

Next, radio network designing apparatus 10 calculates $K_j$ neighboring cell traffic load ratios for each cell (Step 202). Here, the neighboring cell traffic load ratio is the ratio of the traffic load of the target cell to the traffic load of a neighboring cell. This neighboring cell traffic load ratio is a cell balance value that represents the extent to which the traffic load on the target cell has been balanced relative to the neighboring cell. A neighboring cell traffic load ratio $R_{jk}$ of the target cell with cell number j to the neighboring cell with cell number k can be determined by formula (1).

[Math 1]

$$R_{jk} = \frac{L_{cell,j}}{L_{cell,k}} \quad (k \in Z_j) \quad (1)$$

It is assumed that $R_{jk}=1.0$ when $Z_j$ is a null set.

In formula (1), $L_{cell,j}$ is the traffic load on the target cell with cell number j. $L_{cell,k}$ is the traffic load on the neighboring target cell with cell number k. Traffic loads can be calculated by the radio network designing tool.

The method for calculating traffic loads will be described with reference to FIG. 5. Here, an example of calculating the traffic load on cell $21_1$ will be described. To begin with, lattice points are arranged in the area and the expected traffic quantity for every lattice point is previously set. In FIG. 5, only the lattice points on cell $21_1$ as the calculation target are shown. The cell in which each lattice point exists is determined depending on the base station (or antenna) from which the lattice point receives the signal of the maximum reception level. Traffic load $L_{cell,1}$ on cell $21_1$ can be determined by calculating the sum of the expected traffic quantities at the lattice points existing inside cell $21_1$ with cell number j=1.

Returning next to FIG. 4, radio network designing apparatus 10 determines objective functions that will be the indicator for evaluating the traffic load balance between cells, based on the $K_j$ neighboring traffic load ratios for each cell. It is preferable that a representative value that represents statistical properties as an evaluation indicator for the traffic load balance between the target cell and the neighboring cells is selected as the objective function.

In the present embodiment, specifically, the maximum and minimum are determined from $K_j$ neighboring traffic load ratios, and these two are used as the objective functions (Step 203). Here, the maximum among the $K_j$ neighboring cell traffic load ratios will be called maximum traffic load ratio $R_{max}(j)$ and the minimum among the $K_j$ neighboring cell traffic load ratios will be called minimum traffic load ratio $R_{min}(j)$. Maximum traffic load ratio $R_{max}(j)$ is expressed by formula (2) and minimum traffic load ratio $R_{min}(j)$ is expressed by formula (3).

[Math 2]

$$R_{max}(j) = \max_{k \in Z_j}(R_{jk}) \quad (2)$$

$$R_{min}(j) = \min_{k \in Z_j}(R_{jk}) \quad (3)$$

Since the cell area varies as the antenna's tilt angle is modified, resultantly the traffic load on the cell varies, $R_{max}(j)$ and $R_{min}(j)$, which are the traffic load ratios, can be regarded as functions that use the antenna's tilt angle as a parameter.

Radio network designing apparatus 10 of the present embodiment performs an optimization process such that these objective functions $R_{max}(j)$ and $R_{min}(j)$ become closer to "1". It can said that the closer to "1" objective functions $R_{max}(j)$ and $R_{min}(j)$ are, the smaller the difference of the traffic load on the target cell from the traffic loads on the neighboring cells. Accordingly, when optimization is performed so that the calculated values of these objective functions become closer to the target value "1", balance between cells can be established.

Though in the present embodiment, the maximum and minimum among $K_j$ traffic load ratios are selected as the representatives to be the objective functions, the present invention should not be limited to this. As another example, the second greatest and second smallest ratios may be selected to be the objective functions in a policy such that cells that present extremely imbalanced traffic loads should be excluded from evaluation. Also, as a still another example, the mean value of the traffic load ratios greater than "1" and the mean value of the traffic load ratios smaller than "1" may be used as the objective functions.

Radio network designing apparatus 10 of the present embodiment, as an example of an optimization process for the whole area, performs optimization for maximum traffic load ratio $R_{max}(j)$ first, then performs optimization for minimum traffic load ratio $R_{min}(j)$, and iterates this cycle a multiple number of times.

Figure 6:
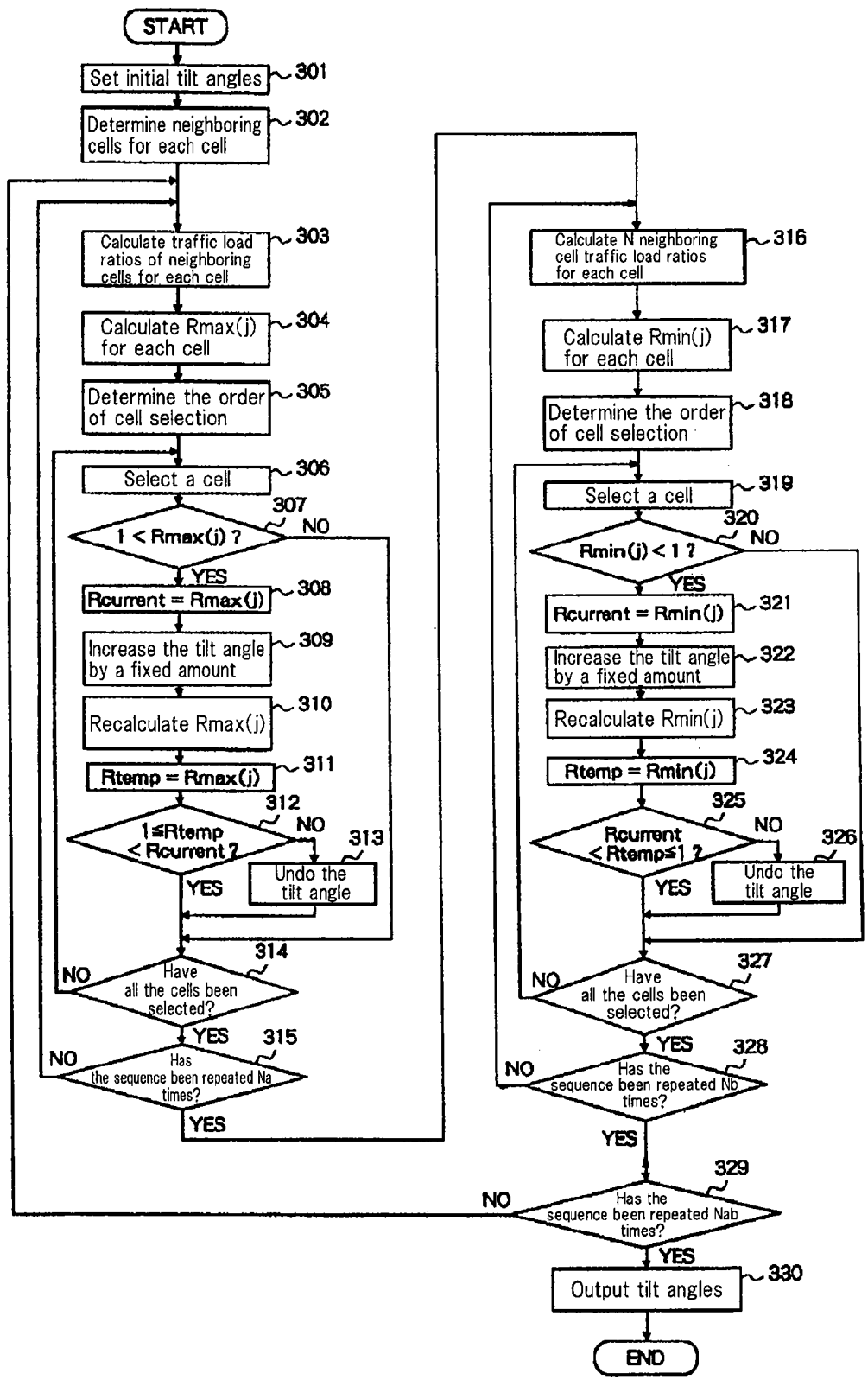
FIG. 6 is a flow chart showing an optimization process for the whole area in the first embodiment.

FIG. 6 is a flow chart showing an optimization process for the whole area in the first embodiment. Referring to FIG. 6, radio network designing apparatus 10 sets the initial tilt angle of the antenna of each cell first (Step 301). Next, radio network designing apparatus 10 determines $K_j$ neighboring cells of each cell (Step 302).

Next, radio network designing apparatus 10 calculates the neighboring cell traffic load ratios for each cell (Step 303). Each cell (cell number j) involves $K_j$ neighboring traffic load ratios.

Next, radio network designing apparatus 10 determines maximum traffic load ratio $R_{max}(j)$ of $K_j$ neighboring cell's traffic load ratios for each cell (cell number j) (Step 304). Further, radio network designing apparatus 10 determines the order of cell selection in order of decreasing maximum traffic load ratio $R_{max}(j)$(Step 305). Then, radio network designing apparatus 10 selects a cell based on the determined order of cell selection (Step 306).

Next, radio network designing apparatus 10 determines whether $1<R_{max}(j)$ holds or not for the selected cell (Step 307). If $1<R_{max}(j)$ does not hold, no change of the tilt angle is made because it is not necessary to make it further smaller if the maximum traffic load ratio is smaller than "1".

If $1<R_{max}(j)$ holds, radio network designing apparatus 10 sets the value of $R_{max}(j)$ into $R_{current}$ (Step 308) and increases the tilt angle by a fixed amount (e.g., 1 degree) (Step 309) and recalculates $R_{max}(j)$ (Step 310). An increase of the tilt angle makes the cell area smaller and shows a tendency of reducing the traffic load. Then radio network designing apparatus 10 sets the value of $R_{max}(j)$ into $R_{temp}$ (Step 311) and determines whether $1 \leq R_{temp} < R_{current}$ holds or not (Step 312).

Radio network designing apparatus 10 maintains the tilt angle if $1 \leq R_{temp} < R_{current}$ holds, whereas it undoes the tilt angle unless $1 \leq R_{temp} < R_{current}$ holds (Step 313). The condition in which $1 \leq R_{temp} < R_{current}$ does not hold is considered as one in which the maximum traffic load ratio will not approach "1", so that the tilt angle is to be undone.

Next, radio network designing apparatus 10 determines whether all the cells have been selected (Step 314). If all the cells have not been selected, radio network designing apparatus 10 returns to the operation at Step 306 and selects a next cell. On the other hand, if all the cells have been selected, radio network designing apparatus 10 determines whether the sequence of Steps 303~314 has been repeated a predetermined number of times (Na times) (Step 315). If the sequence has not been repeated Na times, radio network designing apparatus 10 returns to Step 303.

On the other hand, if the sequence has been repeated Na times, radio network designing apparatus 10 calculates the neighboring traffic load ratios for each cell (Step 316). Each cell (cell number j) involves $K_j$ neighboring traffic load ratios.

Next, radio network designing apparatus 10 determines minimum traffic load ratio $R_{min}(j)$ of $K_j$ neighboring cell traffic load ratios for each cell (cell number j) (Step 317). Further, radio network designing apparatus 10 determines the order of cell selection in order of increasing maximum traffic load ratio $R_{min}(j)$ (Step 318). Then, radio network designing apparatus 10 selects a cell based on the determined order of cell selection (Step 319).

Next, radio network designing apparatus 10 determines whether $R_{min}(j) < 1$ holds or not for the selected cell (Step 320). If $R_{min}(j) < 1$ does not hold, radio network designing apparatus 10 will make no change in tilt angle because it is not necessary to make it greater if the minimum traffic load ratio is equal to or greater than "1".

If $R_{min}(j) < 1$ holds, radio network designing apparatus 10 sets the value of $R_{min}(j)$ into $R_{current}$ (Step 321) and decreases the tilt angle by a fixed amount (e.g., 1 degree) (Step 322) and recalculates $R_{min}(j)$ (Step 323). A decrease of the tilt angle makes the cell area greater and shows a tendency of increasing the traffic load. Then radio network designing apparatus 10 sets the value of $R_{min}(j)$ into $R_{temp}$ (Step 324) and determines whether $R_{current} < R_{temp} \leq 1$ holds or not (Step 325). The condition in which $R_{current} < R_{temp} \leq 1$ does not hold is considered as one in which the minimum traffic load ratio will not approach "1", so that the tilt angle is to be undone.

Radio network designing apparatus 10 maintains the tilt angle if $R_{current} < R_{temp} \leq 1$ holds, whereas it undoes the tilt angle if $R_{current} < R_{temp} \leq 1$ does not hold (Step 326).

Next, radio network designing apparatus 10 determines whether all the cells have been selected (Step 327). If all the cells have not been selected, radio network designing apparatus 10 returns to the operation at Step 319 and selects a next cell. On the other hand, if all the cells have been selected, radio network designing apparatus 10 determines whether the sequence of Steps 316~327 has been repeated a predetermined number of times (Nb times) (Step 328). If the sequence has not been repeated Nb times, radio network designing apparatus 10 returns to Step 316.

If the sequence has been repeated Nb times, radio network designing apparatus 10 determines whether the sequence of Steps 303~328 has been repeated a predetermined number of times (Nab times) (Step 329). If the sequence has not been repeated Nab times, radio network designing apparatus 10 returns to Step 303.

If the sequence has been repeated Nb times, radio network designing apparatus 10 outputs the tilt angle of every antenna after optimization (Step 330).

As has been described, according to the present embodiment, radio network designing apparatus 10 is constructed such that objective function extractor 11 sets up a radio parameter that can be modified at base stations as a parameter and determines objective functions that represent the degree of the balance between cells using the difference from the target value and such that optimizer 12 modifies the parameter of the objective functions using an optimization algorithm so as to make the objective functions closer to the target value. Accordingly, in designing a radio network including a plurality of cells, it is possible for the operator to easily balance traffic loads between cells without the necessity of repeating troublesome operations.

The radio network formed of a plurality of cells has a property in which the traffic load on the target cell is distributed to the neighboring cells so that the cells affect each other. In the present embodiment, since the balance between the target cell and the neighboring cells is evaluated, it is possible to achieve correct cell balancing by the optimization process taking this property into account.

Further, in the present embodiment, since the representative values that are determined from the traffic load ratios between the target cell and multiple neighboring cells are used as the objective functions to achieve the optimization process, the number of objective functions is reduced so that the process can be simplified.

Also, since the maximum and minimum of the traffic load ratios to the neighboring cells are taken as the representative values, it is possible to fairly balance the cells including plural neighboring cells that are represented by the representative values.

Further, according to the present embodiment, when the maximum traffic load ratio is smaller than 1 modification of the parameter (tilt angle) to make it smaller is not made. Also, when the minimum traffic load ratio is greater than 1 modification of the parameter (tilt angle) to make it greater is not made. It is therefore possible to search for the parameter that correctly balances traffic loads balance between cells.

Moreover, according to the present embodiment mode, the parameter is modified only when the maximum traffic load ratio or minimum traffic load ratio becomes closer to 1 and the parameter is undone unless so. It is therefore possible to search for the beneficial parameter while confirming the improvement of the traffic load balance between cells.

The description of the first embodiment heretofore was made by using the tilt angle of the antenna at each base station as an example of the parameter for the objective functions of the optimization algorithm. However, the present invention should not be limited to this. As another example of the parameter for the objective functions, the transmission power from each antenna may be used.

When the transmission power from each antenna is taken as the parameter, as general properties, if the transmission power is lowered the cell area becomes smaller and the traffic load of the cell decreases. Conversely, when the transmission power is increased, the cell area becomes greater and the traffic load of the cell increases. Accordingly, if the transmission power is used as the parameter for the objective functions instead of the tilt angle, it is possible to achieve a similar result without losing the generality of the first embodiment.

(The Second Embodiment)

In a communication network including a radio network, the degree of degradation of the communication quality in an area is represented as the degradation ratio which is a ratio of spots at which communication quality degrades to the predetermined area. Herein, a spot at which SIR (signal power-to-interference power ratio), for example, does not meet the predetermined value is referred to as the spot at which communication quality degrades. In the present embodiment mode, a configuration in which traffic loads are balanced between cells, while suppressing the degradation ratios at important areas to low levels, will be exemplified. The radio network designing apparatus according to the second embodiment has the same configuration as that in the first embodiment shown in FIG. 2. The schematic operation of the radio network designing apparatus according to the second embodiment is the same as that of the first embodiment shown in FIG. 3.

However, the second embodiment is different from the first embodiment in that both objective functions and constraint condition are used in its optimization process. In the present embodiment, objective function extractor 11 also extracts a constraint condition in addition to extracting objective functions. In the present embodiment, the degradation ratio of an important area is adopted as the objective function while the maximum traffic load ratio $R_{max}(j)$ and the maximum traffic load ratio $R_{min}(j)$ are adopted as the constraint condition for the optimization algorithm. As the parameter for the objective functions, the antenna tilt angle is used as in the first embodiment.

The constraint condition in the optimization algorithm is the condition that is imposed when the parameter that improves the value of the objective functions is searched for. As the optimization algorithm in the second embodiment, a general-purpose algorithm such as a one-by-one method and a genetic algorithm can be used similarly to the first embodiment.

The second embodiment mode exemplifies an optimization algorithm that decreases the degradation ratio of the whole area first, then further reduces the degradation ratio of an important area while taking into account the degradation ratio of the whole area.

Figure 7:
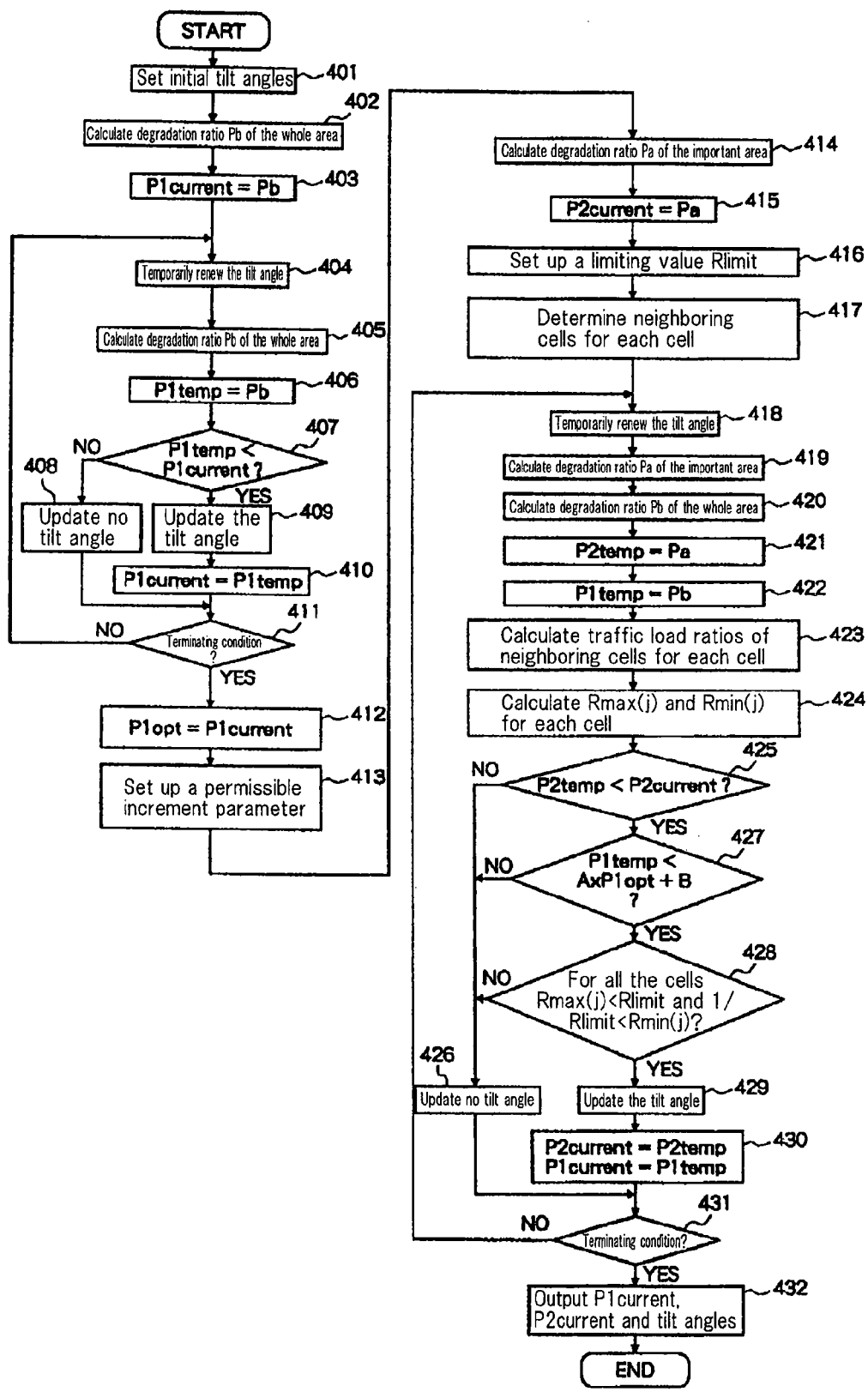
FIG. 7 is a flow chart showing an optimization processing for the whole area in the second embodiment.

FIG. 7 is a flow chart showing an optimization process for the whole area in the second embodiment. Herein, an example in which the degradation ratio of the whole area is reduced and then the degradation ratio of an important area is reduced, will be shown. The degradation ratio of the important area is adopted as the objective function; it is preferable that this degradation ratio is preferred to be as low as possible. Accordingly, in the present embodiment, an optimization process in order to make the objective function closer to the target "0" is carried out. Note, however, that the constraint condition by the maximum traffic load ratio $R_{max}(j)$ and minimum traffic load ratio $R_{min}(j)$ is imposed on the optimization process. In FIG. 7, Steps 401 to 413 are the stage for reducing the degradation ratio of the whole area and Steps 414 to 432 are the stage for reducing the degradation ratio of the important area.

Referring to FIG. 7, radio network designing apparatus 10 sets the initial tilt angle of the antenna of each cell first (Step 401). Next, radio network designing apparatus 10 calculates degradation ratio Pb of the whole area (Step 402).

Next, radio network designing apparatus 10 sets the value of degradation ratio Pb into $P1_{current}$ (Step 403), temporarily renews the tilt angle (Step 404) and recalculates degradation ratio Pb of the whole area (Step 405). Temporary renewal means that the tilt angle of any one of the antennas is temporarily modified by a predetermined amount. This modification may be either a change for increase or a change for decrease. Since in the present embodiment, the temporary renewal of the tilt angle and its conformation are repeated a multiple number of times, it is preferable that changes for an increase and changes for a decrease are done in combination. For example, renewal may be done by setting the number of times of repetition at 60, and the tilt angle may be decreased for the first to tenth, twenty-first to thirtieth and forty-first to fiftieth times and the tilt angle may be increased for the eleventh to twentieth, thirty-first to fortieth and fifty-first to sixtieth times.

Further, various selecting methods can be considered to select the antenna whose tilt angle is modified. For example, when the tilt angle is made smaller, the antenna of a cell whose degradation ratio is equal to or greater than a predetermined value may be selected so as to reduce its tilt angle. When the tilt angle is made greater, the antenna of a cell whose degradation ratio is smaller than a predetermined value may be selected so as to increase its tilt angle.

Though the extent to which the tilt angle of the antenna is modified is undetermined, it may be changed by a fixed angle, for example.

When other methods are used to select the antenna to be temporarily renewed and to determine the angle for temporary renewal of the tilt angle, a general optimization algorithm in the field of combinatorial optimization using the degradation ratio as an objective function, or a genetic algorithm may be used.

Next, radio network designing apparatus 10 sets degradation ratio Pb into $P1_{temp}$ (Step 406) and determines whether $P1_{temp}$ is smaller than $P1_{current}$ or not (Step 407). This is to determine whether degradation ratio Pb of the whole area is improved by the renewal of the tilt angle.

If $P1_{temp}$ is not smaller than $P1_{current}$, radio network designing apparatus 10 discards the temporary renewal and does not update any tilt angle (Step 408). On the other hand, if $P1_{temp}$ is smaller than $P1_{current}$, radio network designing apparatus 10 updates the tilt angle in accordance with the temporary renewal (Step 409) and sets $P1_{temp}$ into $P1_{current}$ (Step 410).

Steps 404 to 410 are repeated until a predetermined terminating condition is satisfied. For example, the event in which the number of times of repetition has reached a predetermined number may be regarded as the terminating condition. As another example, the state in which $P1_{current}$ is less than a predetermined value may be regarded as the terminating condition. Radio network designing apparatus 10 determines whether the terminating condition has been satisfied (Step 411). If the terminating condition has not been satisfied, radio network designing apparatus 10 returns to Step 404.

If the terminating condition has been satisfied, radio network designing apparatus 10 sets the value of $P1_{current}$ into $P1_{opt}$ (Step 412). This causes the smallest degradation ratio in the process heretofore to be set into $P1_{opt}$. At this point, the tilt angles are set at values so as to realize degradation ratio $P1_{opt}$ for the whole area.

Next, radio network designing apparatus 10 sets up a permissible increment parameter (Step 413). The permissible increment parameter is a value that designates to what extent the degradation ratio should be improved to permit renewal of the tilt angle when the degradation ratio of the important area is optimized. This permissible increment parameter is determined based on P1opt. As a specific example, the permissible increment parameter involves proportionality factor A and constant B. A and B may be input by the operator. When the condition in which the degradation ratio of the whole area is smaller than $A \times P1_{opt} + B$ holds, the tilt angle is permitted to be renewed.

Next, radio network designing apparatus 10 calculates degradation ratio Pa of the important area (Step 414) and sets the value of the degradation ratio into $P2_{current}$ (Step 415).

Next, radio network designing apparatus 10 sets up limiting value $R_{limit}$ for the neighboring cell traffic load ratios (Step 416). This limiting value $R_{limit}$ is a value that limits maximum traffic load ratio $R_{max}(j)$ and maximum traffic load ratio $R_{min}(j)$ as the constraint condition. When the degradation ratio of the important area is optimized, the tilt angle that makes the maximum traffic load ratio $R_{max}(j)$ and the maximum traffic load ratio $R_{min}(j)$ satisfy predetermined relationships with limiting value $R_{limit}$ is permitted. The value of limiting value $R_{limit}$ may also be input by the operator.

Next, radio network designing apparatus 10 determines $K_j$ neighboring cells of every cell (Step 417). Then radio network designing apparatus 10 temporarily renews the tilt angle (Step 418), recalculates degradation ratio Pa of the important area (Step 419) and calculates degradation ratio Pb of the whole area (Step 420). The method of temporary renewal of the tilt angle may be the same as that used at Step 404.

Next, radio network designing apparatus 10 sets the value of degradation ratio Pa of the important area into $P2_{temp}$ (Step 421) and sets the value of degradation ratio Pb of the whole into $P1_{temp}$ (Step 422). Then radio network designing apparatus 10 calculates the neighboring cell traffic load ratios for each cell (Step 423). Each cell (cell number j) involves $K_j$ neighboring traffic load ratios.

Next, radio network designing apparatus 10 determines maximum traffic load ratio $R_{max}(j)$ and minimum traffic load ratio $R_{min}(j)$ from $K_j$ neighboring cell traffic load ratios for each cell (cell number j) (Step 424).

Next, radio network designing apparatus 10 determines whether $P2_{temp} < P2_{current}$ holds (Step 425). This step is to determine whether the degradation ratio of the important area is improved by the temporary renewal of the tilt angle. If $P2_{temp} < P2_{current}$ does not hold, radio network designing apparatus 10 discards the temporary renewal and does not update any tilt angle (Step 426). On the other hand, if $P2_{temp} < P2_{current}$ holds, radio network designing apparatus 10 determines whether $P1_{temp} < A \times P1_{opt} + B$ holds (Step 427). This step is to determine whether the renewal of the tilt angle is permitted, by determining whether the degradation ratio of the whole area is smaller than $P2_{temp} < P2_{current}$.

If $P1_{temp} < A \times P1_{opt} + B$ does not hold, radio network designing apparatus 10 discards the temporary renewal and does not update any tilt angle (Step 426). On the other hand, if $P1_{temp} < A \times P1_{opt} + B$ holds, radio network designing apparatus 10 then determines whether $R_{max}(j) < R_{limit}$ and $1/R_{limit} < R_{min}(j)$ hold (Step 428). This is to determine whether the renewal of the tilt angle is permitted, by determining whether the degradation ratio of the whole area is smaller than $P2_{temp} < P2_{current}$. This is to determine that maximum traffic load ratio $R_{max}(j)$ is smaller than limiting value $R_{limit}$ and that maximum traffic load ratio $R_{min}(j)$ is greater than $1/R_{limit}$. By this operation, the tilt angle is updated while the traffic load balance of the all the cells is kept within a fixed value range. As a result, the traffic loads of all the cells can be maintained in balance within a fixed range.

If $R_{max}(j) < R_{limit}$ and $1/R_{limit} < R_{min}(j)$ do not hold, radio network designing apparatus 10 goes to Step 426. On the other hand, if $R_{max}(j) < R_{limit}$ and $1/R_{limit} < R_{min}(j)$ hold, radio network designing apparatus 10 updates the tilt angle in accordance with the temporary renewal (Step 429), and sets $P2_{temp}$ into $P2_{current}$ and sets $P1_{temp}$ into $P1_{current}$ (Step 430). Steps 414 to 431 are repeated until a predetermined terminating condition is satisfied. For example, the event in which the number of times that repetitions have reached a predetermined number, may be regarded as the terminating condition.

After Step 426, or after Step 430, radio network designing apparatus 10 determines whether the terminating condition is satisfied or not (Step 431). For example, the event in which the number of times that repetitions have reached a predetermined number, may be regarded as the terminating condition. As another example, the state in which $P2_{current}$ is less than a predetermined value may be regarded as the terminating condition. If the terminating condition has not been satisfied, radio network designing apparatus 10 returns to Step 414. If the terminating condition has been satisfied, radio network designing apparatus 10 outputs $P1_{current}$, $P2_{current}$ and the tilt angle of each antenna (Step 432). $P1_{current}$ is the degradation ratio of the whole area after improvement and $P2_{current}$ is the degradation ratio of the important area after improvement.

As has been previously described, according to the present embodiment mode, radio network designing apparatus 10 uses a radio parameter that can be modified at base stations as a parameter and determines an objective function that represents the degradation ratio of an important area using the difference from the target value and further determines constraint condition for balancing the traffic loads between cells in the optimization process of the objective function and modifies the parameter of the objective function using an optimization algorithm with the constraint condition so as to make the objective function closer to the target value. Accordingly, in designing the radio network including a plurality of cells, it is possible to easily balance traffic loads between cells while reducing the degradation ratio of the important area.

The description of the second embodiment heretofore was made by using the tilt angle of the antenna at each base station as an example of the parameter for the objective function of the optimization algorithm. However, the present invention should not be limited to this. As another example of the parameter for the objective function, the transmission power from each antenna may be used.

When the transmission power from each antenna is taken as the parameter, as general properties, if the transmission power is lowered the radio waves become hard to spread among the coverage area, hence the degradation ratio increases. Conversely, when the transmission power is increased, the radio waves can easily spread among the coverage area, hence the degradation ratio decreases. Accordingly, if the transmission power is used as the parameter for the objective function instead of the tilt angle, it is possible to achieve a similar result without losing the generality of the second embodiment.

(The Third Embodiment)

When the distribution of traffic loads is uniform, the traffic load is proportional to the cell area. So, the third embodiment is a configuration in which the cell area is used instead of the traffic load in the first embodiment. The cell area of a cell with cell number j may be used instead of $L_{cell,j}$ in the first embodiment, and the cell area of a cell with cell number k may be used instead of $L_{cell,k}$. The cell area can be expressed by the number of lattice points arranged over the cell.

With this configuration, it is possible to easily balance traffic loads between cells in designing a radio network including a plurality of cells, in the same manner as in the first embodiment.

(The Fourth Embodiment Mode)

The fourth embodiment is a configuration in which the cell area is used instead of the traffic load in the second embodiment. The cell area of a cell with cell number j may be used instead of $L_{cell,j}$ in the second embodiment, and the cell area of a cell with cell number k may be used instead of $L_{cell,k}$. The cell area can be expressed by the number of lattice points arranged over the cell. Instead of maximum traffic load ratio $R_{max}(j)$ and minimum traffic load ratio $R_{min}(j)$, the maximum and minimum of the ratios of the area of the target cell to that of the neighboring cells may be used.

According to this configuration, it is possible to easily keep a balance between cells and to reduce the degradation ratio of the important area in designing a radio network including a plurality of cells, in the same manner as in the second embodiment.

(The Fifth Embodiment Mode)

This is an example of the present invention applied to HSDPA (High Speed Downlink Packet Access) that uses a channel whose channel performance is adaptively changed and that is temporally based on SIR that represents the quantity of the received signal.

The fifth embodiment mode is different from the first embodiment mode as regards the method of calculating traffic loads. The method of calculating traffic loads of the fifth embodiment will be described. First, the SIR of the received signal from the base station at every lattice point in the evaluation area is calculated, and the reciprocal of the mean value of the radio channel throughputs corresponding to the SIRs in the cell is determined. Then, the traffic quantity expressed in a bit rate at each lattice point is taken as the amount of data arising per unit time, so that its sum in the cell is determined. Further, the product of the reciprocal of the mean value of the radio channel throughputs inside the cell and the sum of the amount of data generated per unit time inside the cell is assumed to be the traffic load.

The traffic load calculated by this method indicates the temporal usage rate of the channel or traffic load in HSDPA using a channel whose performance is adaptively changed temporally according to SIR.

With this, it is possible to easily balance traffic loads between cells in HSDPA.

(The Sixth Embodiment)

The sixth embodiment is different from the second embodiment in the calculating method of traffic loads. The calculating method of traffic loads of the sixth embodiment is the same as that of the fifth embodiment. The traffic load calculated by this method indicates the temporal usage rate of the channel or traffic load in HSDPA using a channel whose performance is adaptively changed temporally based on SIR.

In accordance with this, it is possible to easily balance traffic loads between cells in HSDPA while simply reducing the degradation ratio of the important area.

In each of the embodiments described heretofore, though examples for establishing a balance between cells were shown by describing the balance of traffic loads or cell areas, the present invention should not be limited to these.

Further, the first embodiment was illustrated taking an example of making the neighboring cell traffic load ratio closer to 1 and the second embodiment was illustrated taking an example of constraining it at a value close to "1". The present invention, however, should not be limited to this. The neighboring cell traffic load ratio may be made closer to or constrained at another numerical value depending on the resource of each base station such as the number of transmitter-receivers deployed in each cell.

The invention claimed is:

1. A radio network designing apparatus for designing a radio network that covers a plurality of cells through ratio waves from base stations, comprising:

an objective function extractor for setting up an optimizing condition that at least includes an objective function that has a radio parameter of said base station as the objective function parameter and that is used for an optimization process carried out by a computer to balance traffic loads between a plurality of cells, by using cell balance values between a target cell whose characteristic changes by modification of the parameter and multiple neighboring cells existing around the target cell; and an optimizer for performing an optimization process in accordance with said optimizing condition set by said objective function extractor to determine the value of said parameter to be the solution, wherein said objective function extractor sets up the objective function showing a degradation ratio of an important area and a constraint condition in which satisfying a predetermined relationship with a target value means better balance between the cells, as said optimizing condition; the degradation ratio in the important area being lower than that in the other areas, and wherein said optimizer performs optimization so as to reduce the value of said objective function by modifying said parameter within a range in which said constraint condition satisfies said predetermined relationship with said target value, and wherein said constraint condition is the cell balance values between said target cell and neighboring cells.

2. The radio network designing apparatus according to claim 1, wherein said objective function extractor sets up the objective function that the closing to a target value means the better balance between the cells, as said optimizing condition; and said optimizer performs optimization so that said objective function approaches the target value by modifying said parameter.

3. The radio network designing apparatus according to claim 1, wherein said objective function is a maximum and minimum of the cell balance values between said target cell and said multiple neighboring cells.

4. The radio network designing apparatus according to claim 1, wherein said constraint condition is the maximum and minimum of the cell balance values between said target cell and said multiple neighboring cells.

5. The radio network designing apparatus according to claim 1, wherein said cell balance value is a traffic load ratio between said target cell and said neighboring cell.

6. The radio network designing apparatus according to claim 1, wherein said cell balance value is a cell area ratio between said target cell and said neighboring cell.

7. The radio network designing apparatus according to claim 1 wherein said parameter is the tilt angle of the antenna of said base station.

8. The radio network designing apparatus according to claim 1, wherein said parameter is the transmission power from the antenna of said base station.

9. The radio network designing apparatus according to claim 2, wherein said objective function is a representative value of the cell balance values between said target cell and said multiple neighboring cells.

10. A radio network designing method for designing a radio network that covers a plurality of cells through ratio waves from base stations, the method causing a computer to execute the steps of:

setting up an optimizing condition that at least includes an objective function that has a radio parameter of said base station as the objective function parameter and that is used for an optimization process to balance traffic loads between a plurality of cells, by using cell balance values between a target cell whose characteristic changes by modification of the parameter and multiple neighboring cells existing around the target cell; and performing an optimization process in accordance with said set optimizing condition to determine the value of said parameter to be the solution, wherein said objective function shows a degradation ratio of an important area and a constraint condition in which satisfying a predetermined relationship with a target value means better balance between the cells, as said optimizing condition; the degradation ratio in the important area being lower than that in the other areas, and wherein said optimization process is performed so as to reduce the value of said objective function by modifying said parameter within a range in which said constraint condition satisfies said predetermined relationship with said target value, and wherein said constraint condition is the cell balance values between said target cell and neighboring cells.

11. The radio network designing method according to claim 10, further comprising the steps of:

setting up the objective function that closing to a target value means the better balance between the cells, as said optimizing condition; and performing optimization so that said objective function approaches the target value by modifying said parameter.

12. The radio network designing method according to claim 10, wherein said objective function is a maximum and minimum of the cell balance values between said target cell and said multiple neighboring cells.

13. The radio network designing method according to claim 10, wherein said constraint condition is the maximum and minimum of the cell balance values between said target cell and said multiple neighboring cells.

14. The radio network designing method according to claim 10, wherein said cell balance value is a traffic load ratio between said target cell and said neighboring cell.

15. The radio network designing method according to claim 10, wherein said cell balance value is a cell area ratio between said target cell and said neighboring cell.

16. The radio network designing method according to claim 10, wherein said parameter is the tilt angle of the antenna of said base station.

17. The radio network designing method according to claim 10, wherein said parameter is the transmission power from the antenna of said base station.

18. The radio network designing method according to claim 11, wherein said objective function is a representative value of the cell balance values between said target cell and said multiple neighboring cells.

19. A non-transitory computer-readable medium containing a radio network designing program for enabling a computer to design a radio network that covers a plurality of cells through ratio waves from base stations, said non-transitory computer-readable medium causing the computer to: set up an optimizing condition that at least includes an objective function that has a radio parameter of said base station as the objective function parameter and that is used for an optimization process to balance traffic loads between a plurality of cells, by using cell balance values between a target cell whose characteristic changes by modification of the parameter and multiple neighboring cells existing around the target cell; and perform an optimization process in accordance with said set optimizing condition to determine the value of said parameter to be the solution, wherein said objective function shows a degradation ratio of an important area and a constraint condition in which satisfying a predetermined relationship with a target value means better balance between the cells, as said optimizing condition; the degradation ratio in the important area being lower than that in the other areas, and wherein said optimization process is performed so as to reduce the value of said objective function by modifying said parameter within a range in which said constraint condition satisfies said predetermined relationship with said target value, and wherein said constraint condition is the cell balance values between said target cell and neighboring cells.

20. A radio network designing apparatus for designing a radio network that covers a plurality of cells through ratio waves from base stations, comprising:

objective function extracting means for setting up an optimizing condition that at least includes an objective function that has a radio parameter of said base station as the objective function parameter and that is used for an optimization process to balance traffic loads between a plurality of cells, by using cell balance values between a target cell whose characteristic changes by modification of the parameter and multiple neighboring cells existing around the target cell; and optimizing means for performing an optimization process in accordance with said optimizing condition set by said objective function extracting means to determine the value of said parameter to be the solution, wherein said objective function extracting means sets up an objective function showing a degradation ratio of an important area and a constraint condition in which satisfying a predetermined relationship with a target value means better balance between the cells, as said optimizing condition; the degradation ratio in the important area being lower than that in the other areas, and wherein said optimizing means performs optimization so as to reduce the value of said objective function by modifying said parameter within a range in which said constraint condition satisfies said predetermined relationship with said target value, and wherein said constraint condition is the cell balance values between said target cell and neighboring cells.

* * * * *